United States Patent [19]

Sekiguchi et al.

[11] 4,262,305
[45] Apr. 14, 1981

[54] TV CAMERA

[75] Inventors: Takeshi Sekiguchi; Shigeru Ohshima, both of Tokyo, Japan

[73] Assignee: Canon Kabushiki Kaisha, Tokyo, Japan

[21] Appl. No.: 2,096

[22] Filed: Jan. 9, 1979

[30] Foreign Application Priority Data

Jan. 17, 1978 [JP] Japan .................................. 53/3490

[51] Int. Cl.³ .............................................. H04N 9/04
[52] U.S. Cl. ........................................ 358/55; 358/223
[58] Field of Search ................................. 358/55, 223

[56] References Cited

U.S. PATENT DOCUMENTS 3,718,752  2/1973  Katsuta et al. ........................ 358/55
4,084,180  4/1978  Stoffels et al. ........................ 358/55

Primary Examiner—Richard Murray
Attorney, Agent, or Firm—Fitzpatrick, Cella, Harper & Scinto

[57] ABSTRACT

A TV camera comprises an objective lens, a color resolving prism, image pickup devices provided in opposed relationship with the respective exit surfaces of the color resolving prism, and a bias light device. This TV camera is characterized by a novel, small color resolving prism. The color resolving prism comprises four sub-prisms each having a refractive index of 1.6 or higher. The vertical angles of the respective sub-prisms are:

$$23.3° \leq \theta_1 \leq 25.8°$$

$$2° \leq \theta_2 \leq 13°$$

$$28.5° \leq \theta_3 \leq 37.7°$$

$$13.9° \leq \theta_4 \leq 18.2°$$

1 Claim, 15 Drawing Figures

TV CAMERA

BACKGROUND OF THE INVENTION

1. Field of the Invention

This invention relates to a television camera, and more particularly to a television camera using a high refractive index glass material of 1.6 or higher as the prism of color resolution optics.

2. Description of the Prior Art

In a color TV camera, a color resolving prism system is disposed behind an objective lens so as to resolve an image forming beam into three color component lights and image the lights on the surfaces of three to image pickup tubes corresponding to the respective color components. Each of the image pickup tubes scans the image pickup surfaces and converts a picture into an electrical signal.

Image pickup tubes using a fluorescent material such as PbO, AsSes, CdSe or the like as the image pickup surface are common and in a TV camera employing these, it is effective to always impart uniform light of low illumination, namely, the so-called bias illumination to the image pickup surfaces in order to enhance the rising response speed and afterimage characteristic of the image pickup tubes, and the color resolution optics usually has this bias illumination device.

Various color resolving prisms have heretofore been proposed. Typical color resolving prisms are those disclosed in U.S. Pat. No. 3,202,039, German Open Patent Publication No. 2,063,049 and U.S. Pat. No. 3,798,354. A bias light device is known from U.S. Pat. No. 3,767,846.

The configuration of the conventional prism system and the bias illumination method have been developed for the glass material of the prism system such as BK7 or the like which has a refractive index of about 1.5.

Recently, however, to meet the requirements of the optical system for compactness, light weight and high performance, the use of a prism system called a high index prism using a high refractive index glass material of about 1.6 or higher refractive index has been studied, but where a high refractive index glass material is used for the conventionally configured color resolving prism, the critical angle becomes smaller and accordingly this resutls in shading of the bias light.

SUMMARY OF THE INVENTION

It is an object of the present invention to provide a TV camera provided with a small bias light device using a glass material of 1.6 or higher refractive index.

The invention will become more fully apparent from the following detailed description there of taken in conjunction with the accompanying drawings.

DESCRIPTION OF THE PREFERRED EMBODIMENTS

Figure 1:
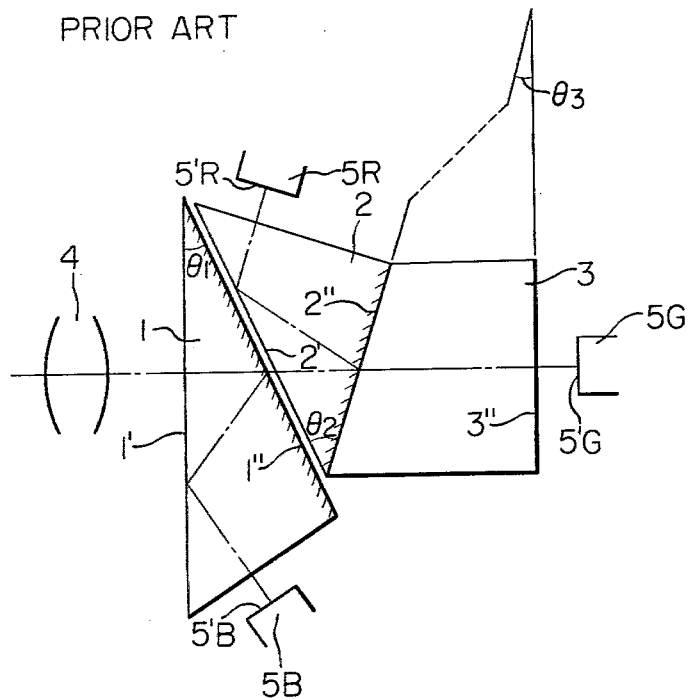
FIG. 1 illustrates the conventional color resolving prism.

Reference is first had to FIG. 1 to describe an example of the commonly used color resolving prism system using three prisms.

The image forming beam from an objective lens 4 passes through the light entrance surface 1' of the color resolving prism system into a first prism system 1, and for example, only the blue component light is reflected by a surface 1'' provided with a dichroic film and further totally reflected by the light entrance surface 1' as to be imaged on the image pickup surface 5'B of an image pickup tube 5B. The beam passed through the dichroic surface 1'' enters into a second prism system 2 and for example, only the red component light is reflected by the surface 2' provided with a dichroic film and further totally reflected by a boundary plane 2' with a parallel air gap provided between the first prism system 1 and the second prism system 2 so as to be imaged on the image pickup surface 5'R of an image pickup tube 5R. The light passed through the dichroic surface 2'', for example, the green component light, passes through a prism 3 and is imaged on the image pickup surface 5'G of an image pickup tube 5G.

The configuration of the prism system is determined by the specification such as the refractive index n and F-number F of the glass material used. This will hereinafter be described.

Let $\theta_1$ and $\theta_2$ be the angles formed between the light entrance surfaces of the first prism 1 and the second prism 2 and the dichroic surfaces and $\theta_3$ be the angle formed between the light entrance surface 2'' and the light exit surface 3'' of the third prism 3. Then, these angles are determined so as to satisfy the following conditions.

$$\theta_1 < \sin^{-1}\left(\frac{1}{n}\right) - \sin^{-1}\left(\frac{1}{2nF}\right) \quad (1)$$

$$2\theta_1 > \sin^{-1}\left(\frac{1}{n}\right) + \sin^{-1}\left(\frac{1}{2nF}\right) \quad (2)$$

$$2\theta_2 > \theta_1 + \sin^{-1}\left(\frac{1}{n}\right) + \sin^{-1}\left(\frac{1}{2nF}\right) \quad (3)$$

$$\theta_3 = \theta_2 - \theta_1 \quad (4)$$

Condition (1) is necessary in order that the color component light to be passed through the dichroic surface 1'' may not be totally reflected by the surface 1''', condition (2) is necessary in order that the color component light reflected by the dichroic surface 1'' may be totally reflected by the surface 1', condition (3) is necessary in order that the color component light reflected by the dichroic surface 2'' may be totally reflected by the surface 2', and condition (4) is necessary in order that the entrance surface 1' and the exit surface 3'' may be parallel to each other.

Also, the length of the light path within the prism must be short and therefore, the angles $\theta_1$ and $\theta_2$ are usually set so as to be small angles within the range allowed by the foregoing conditions.

Figure 2A:
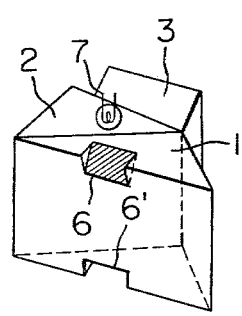
FIGS. 2A, 2B and 2C illustrate a bias light device.
Figure 2B:
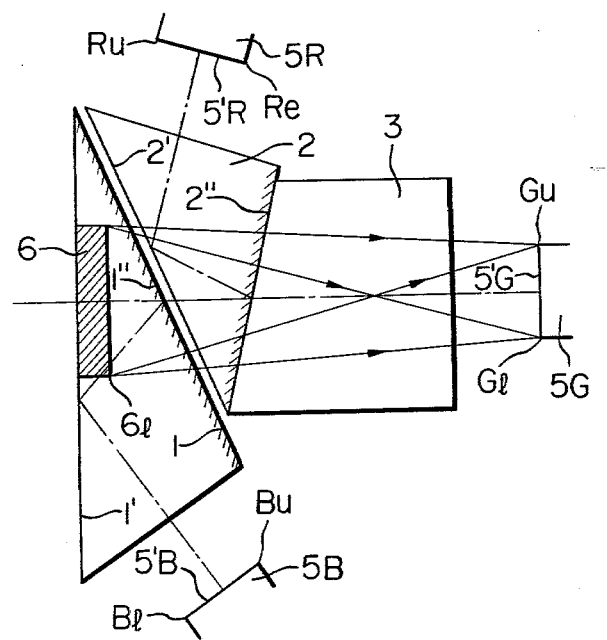
Figure 2C:
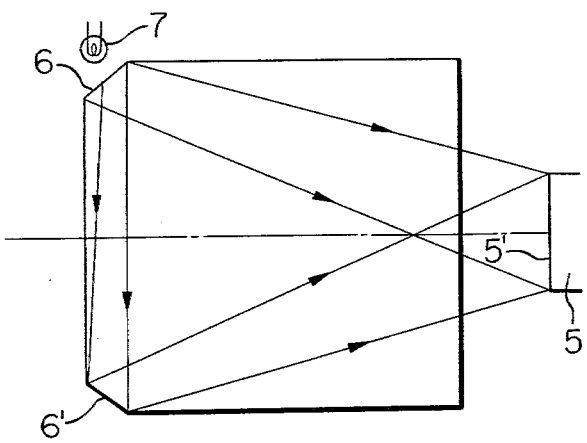

Reference is now had to FIG. 2 to describe the principle of the bias illumination method.

When introducing the bias illumination into the prism, cut-aways 6 and 6' are provided outwardly of that portion of the prism's front surface through which the effective image forming beam passes and if the cut-away 6 is illuminated by a light source 7, part of the beam passed through the cut-away 6 directly illuminates the image pickup surface 5' of the image pickup tube 5 while part of the beam is directed to and reflected by the cut-away 6', whereafter it illuminates the image pickup surface 5' of the image pickup tube 5. The reflected light by the cut-away 6' is necessary to correct the non-uniformity of the illumination which would arise in case of only the direct light from the cut-away 6. The cut-aways 6 and 6' are made into diffusing surfaces or mirrored surfaces to uniformize the illumination and enhance the efficiency thereof.

Figure 3A:
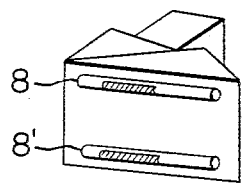
FIGS. 3A and 3B illustrate a bias light device differing from that of FIGS. 2A, 2B and 2C.
Figure 3B:
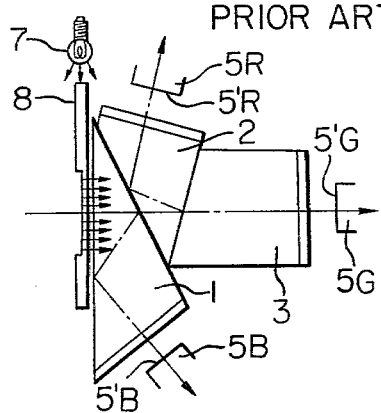

Instead of providing the cut-aways in the prism, two clad rods 8 and 8' may be provided at positions in front of the prism system which do not interfere with the effective image forming beam, as shown in FIG. 3, and a part of the clad rods may be cut away to make this part bright to thereby effect bias illumination.

the bias light so introduced is resolved into various color component light by the dichroic surface provided on the prism system and illuminates the image pickup surfaces 5'B, 5'G and 5'R of the image pickup tubes with a uniform illumination distribution.

The configuration of the prism system and the bias illumination method hitherto described have been developed for the glass material of the prism system such as BK7 or the like which has a refractive index of about 1.5.

Figure 4A:
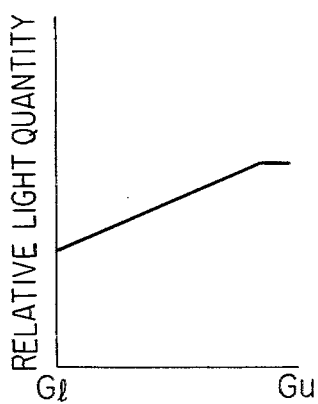
FIGS. 4A, 4B, 4C and 5A, 5B illustrate the color shading of the bias light.
Figure 4B:
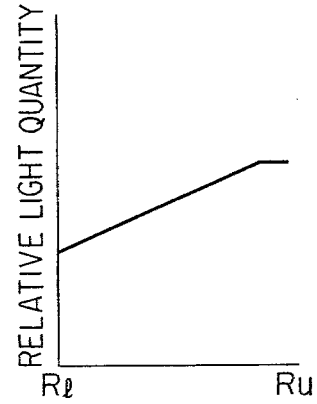
Figure 4C:
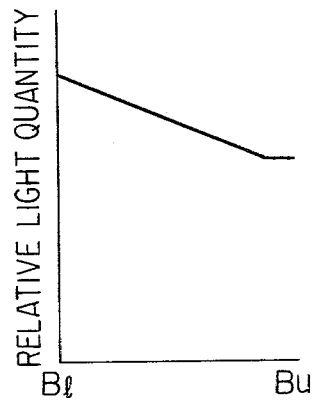

However, to meet the requirements of the optical system for compactness, light weight and high performance, the use of a prism system called a high index prism using a high refractive index glass material is about 1.6 or higher refractive index has been studied. Where a high refractive index glass material is used, the critical angle becomes small and accordingly, in the conventional optical system using three prisms as shown in FIG. 2, the dichroic surface 1" is in contact with the air gap so that part of the bias light is totally reflected by the dichroic surface 1" and thus, part of the bias light which reaches the image pickup surfaces 5'G and 5'R of the image pickup tubes 5G and 5R is lost and the illumination distribution on the image pickup surfaces becomes non-uniform. Such disadvantage is known as shading of the bias light. For example, when considering the illumination distribution of the bias illumination on the image pickup surface 5'G, the bias light directed from the cut-away 6 toward a point $G_u$ in FIG. 2 is incident on the dichroic surface 1" at a small angle so that no total reflection is caused and all the bias light from the cut-away 6 reaches the point $G_a$. However, the bias light directed from the cut-away 6 toward a point $G_l$ and emerging from the point $G_l$ is incident on the dichroic surface 1" at a small angle so that it reaches the point $G_l$ without total reflection, while the bias light directed from the point Gu toward the point $G_l$ is incident on the dichroic surface 1' at an angle greater than the critical angle and thus, it is totally reflected by the dichroic surface 1' and does not reach the point $G_l$ and therefore, the point $G_l$ becmes darker than the point Gu, so that the relative quantity of the bias light on the image pickup surface 5'G has a tendency as indicated by FIG. 4(A). The illumination distribution on the image pickup surface 5'R has the tendency of FIG. 4(B) for the same reason, whereas on the image pickup surface 5'B, the point $B_l$ becomes brighter than the point Bu due to the bias light totally reflected by the dichroic surface 1" and has the tendency of FIG. 4(C).

Such shading of the bias light makes the look of TV pictures very unsightly and must be eliminated in some way or other.

However, in the optical system using three prisms, the configuration of the prisms is determined by conditions (1) to (4) above depending on the F-number as already noted, and it is apparently impossible to eliminate the shading of the bias light.

Reference is now had to FIG. 5 to explain a condition whereby the bias light necessary to derive a condition to be described is not totally reflected in the prism system.

Figure 5A:
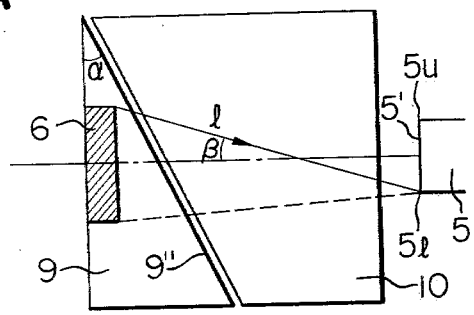

FIGS. 5(A) and (B) are a bottom view and a cross-sectional view, respectively, of a prism system comprising two prisms 9 and 10 and having an air gap for simplicity of illustration. Designated by 6 and 6' are cut-aways for introducing the bias light, and 5 an image pickup tube having an image pickup surface 5'.

Figure 5B:
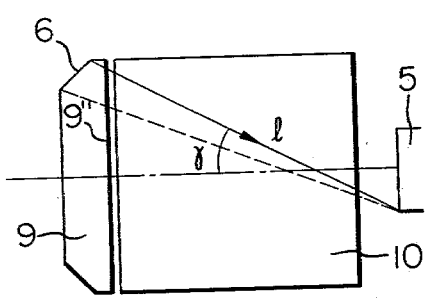

Let $\alpha$ be the angle formed by the boundary plane 9" between the prism 9 and the air gap with respect to a plane perpendicular to the optic axis, $\beta$ be the angle formed by a light ray 1 of the bias light whose angle of incidence on the surface 9" is greatest with respect to the optic axis in FIG. 5(A), and $\gamma$ be the angle formed by the light ray 1 with respect to the optic axis in FIG. 5(B). The symbols $\beta$ and $\gamma$ are used under the same definitions in the following description of embodiments.

The following condition must be satisfied in order that the bias light 1 may not be totally reflected by the surface 9".

$$\cos^{-1}\left\{\frac{\cos(\alpha + \beta)}{\sqrt{1 + \cos^2\beta\tan^2\gamma}}\right\} < \sin^{-1}\left(\frac{1}{n}\right) \tag{5}$$

Here, an example of the fact that the shading of the bias light is unavoidable in an optical system using three prisms is shown.

If, as a specification, the refractive index is 1.7, the F-number 1.4, the length of the light path 32 mm, and the picture plane size 6.6 mm×8.8 mm, then the prism angles $\theta_1$, $\theta_2$ and $\theta_3$ defined in FIG. 1 are as follows:
$\theta_1 = 24°$
$\theta_2 = 36.5°$
$\theta_3 = 12.5°$ If a bias light is introduced into such prism system in the manner shown in FIG. 2, the maximum angle of incidence of the bias light on the dichroic surface 1" becomes:
$\beta = 12°$
$\gamma = 25.5°$
Since $\alpha = \theta_1 = 24°$, the left side of formula (5) is 42.8° and the right side of the same formula is 34.85° and therefore, the bias light is totally reflected by the dichroic surface 1" and there is created shading of the bias light.

As described above, in a high refractive index color resolving prism system using three prisms, there has been a disadvantage that the look of the TV pictures is made very unsightly by the shading of the bias light.

The present invention eliminates such disadvantage. According to the present invention, a color resolving prism system comprises four prisms, of which a first and a second prism are cemented together and the second and third prisms are disposed with an air gap interposed therebetween. More particularly, the present invention is characterized in that it satisfies the following conditions:

$$23.3° \leq \theta_{11} \leq 25.8°$$

$$2° \leq \theta_{12} \leq 13°$$

$$28.5° \leq \theta_{13} \leq 37.7°$$

$$13.9° \leq \theta_{14} \leq 18.2°$$

where $\theta_{11}$, $\theta_{12}$, $\theta_{13}$ and $\theta_{14}$ represent the vertical angles of the respective prisms.

Now, an embodiment of the present invention will be described.

Figure 6:
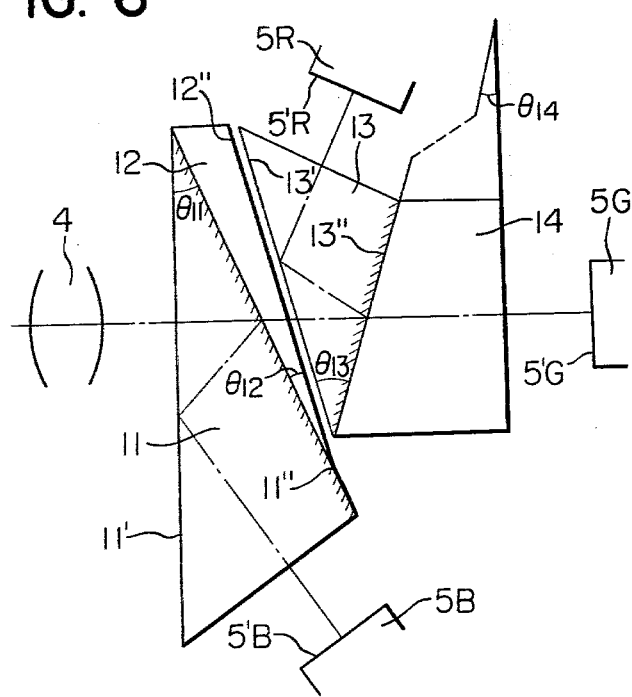
FIG. 6 shows the color resolving prism applicable to the television camera of the present invention.

FIG. 6 shows the construction of the prism system according to the present invention in which a prism 12 having a vertical angle of 13° or less is cemented behind a first prism 11 and a dichroic film may be provided on either of the prism 11 or 12.

The image forming beam from a lens 4 passes through the entrance surface 11' of the color resolving prism system into the first prism 11 and for example, only the blue color component light is reflected by the dichroic surface 11'' while the other color components pass through the dichroic surface 11''. The prisms 11 and 12 are cemented together by an adhesive agent substantially equal in refractive index to glass and therefore, the other color components than the color component light forcibly reflected by the dichroic film are not totally reflected by the surface 11'', thus eliminating the necessity of the aforementioned condition (1), and this is advantageous in that an optical system having a small F-number can be realized. Likewise, the bias light is not totally reflected by the surface 11''.

The components passed through the dichroic surface 11'' pass through the prism 12 and the air gap into a prism 13. The boundary plane 13'' between the prism 12 and the air gap forms an angle of 13° or less with the dichroic surface 11'', and is set to such an angle that the bias light is not totally reflected by the plane 12''. If the plane 12'' is so set, the effective image forming beam is not totally reflected at the plane 12'' in most cases. Of the beam having entered into the prism 12, only the red color component light, for example, is reflected by dichroic surface 13''. Thereafter, the same operation as that described in connection with FIG. 1 will take place.

According to the construction of the present invention, the vertical angles $\theta_{11}$ and $\theta_{13}$ can be set such that the effective image forming beam is totally reflected by the surface 11' and the surface 13' and further, the vertical angle $\theta_{12}$ can be set such that the bias light is not totally reflected by the boundary plane 12'' between the air gap and the prism 12, and it is therefore possible to achieve the intended F-number and at the same time, to provide a good bias illumination.

The conditions to be satisfied by the vertical angles $\theta_{11}$, $\theta_{12}$, $\theta_{13}$ and $\theta_{14}$ of the prisms in the present construction are as follows:

$$2\theta_{11} > \sin^{-1}\left(\frac{1}{n}\right) + \sin^{-1}\left(\frac{1}{2nF}\right) \tag{6}$$

$$\cos^{-1}\left\{\frac{\cos(\theta_{11} - \theta_{13} + \beta)}{\sqrt{1 + \cos^2\beta\tan^2\gamma}}\right\} < \sin^{-1}\left(\frac{1}{n}\right) \tag{7}$$

$$2\theta_{13} > \theta_{11} - \theta_{12} + \sin^{-1}\left(\frac{1}{n}\right) + \sin^{-1}\left(\frac{1}{2nF}\right) \tag{8}$$

$$\theta_{14} = \theta_{13} - \theta_{11} + \theta_{12} \tag{9}$$

Condition (6) is necessary in order that the effective image forming beam reflected by the dichroic surface 11'' may be totally reflected by the surface 11', condition (7) is necessary in order that the bias light may not be totally reflected by the boundary plane 12'' between the prism 12 and the air gap, condition (8) is necessary in order that the effective image forming beam reflected by the dichroic surface 13'' may be totally reflected by the surface 13', and condition (9) is necessary in order that the entrance surface 11' and the exit surface 14'' may be parallel to each other.

Next, examples of the present invention will be given in which the foregoing conditions are satisfied by the construction of the present invention. The specification in the examples is substantially as follows:

|  | (Example 1) | (Example 2) | (Example 3) |
| --- | --- | --- | --- |
| Refractive index | 1.75 | 1.686 | 1.6 |
| F-number | 1.4 | 1.4 | 1.4 |
| Size of the picture plane | 6.6mm × 8.8mm | 6.6mm × 8.8mm | 4.8mm × 6.4mm |
| Length of the light path | 34mm | 35mm | 35mm |
| Introducing means for bias light | Clad rod | Cut-aways provided in the front of the prism | Clad rod |
| Length of the effective introducing portion for bias light | 20mm | 10mm | 10mm |

Figure 7A:
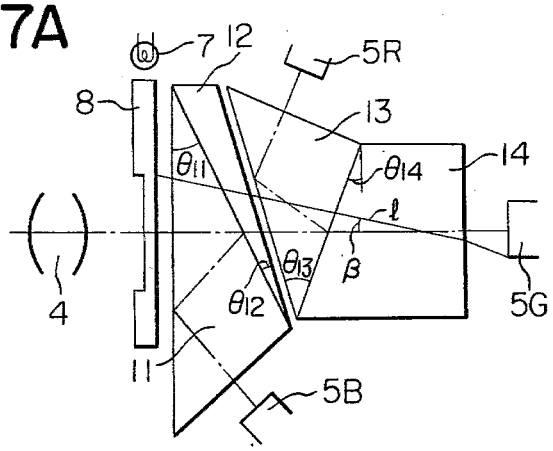
FIGS. 7A and 7B illustrate the optical arrangement in a first embodiment of the television camera according to the present invention.
Figure 7B:
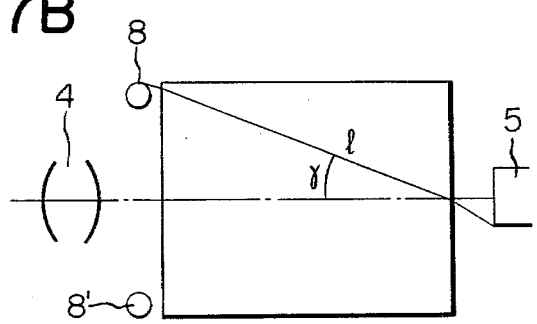
Figure 8A:
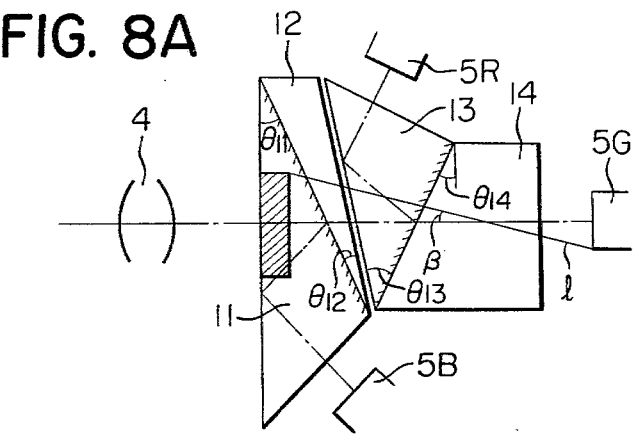
FIGS. 8A and 8B illustrate the optical arrangement in a second embodiment of the present invention.
Figure 8B:
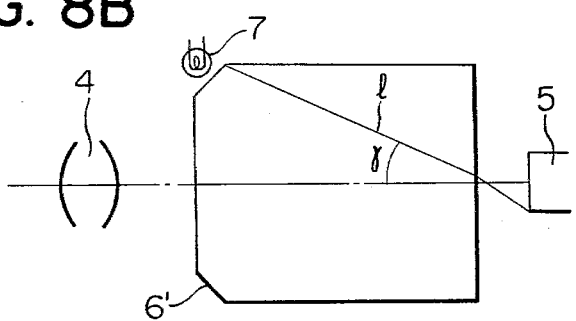

Examples 1 and 3 use the means for introducing the bias rod by the clad rod, as shown in FIG. 7, and the length of the cut-away in the rod is 20 mm for Example 1 and 10 mm for Example 3. In Example 2, the bias light is introduced from the cut-away in the front of the prism as shown in FIG. 8, and the length of the cut-away is 10 mm.

The introducing means for the bias light may be either the means of providing a cut-away in the front surface of the prism or the means using a clad rod, and the length of the effective portion may assume any desired value between 5 to 20 mm in accordance with the brightness of the light source used.

In the case of the specification shown above, the angle which the bias light l entering into the surface 12" at a maximum angle of incidence forms with the optic axis is represented substantially as follows by the aforementioned $\beta$ and $\gamma$.

|   | (Example 1) | (Example 2) | (Example 3) |
|---|---|---|---|
| $\beta$ | 15.5° | 11.5° | 9° |
| $\gamma$ | 25° | 25° | 22° |

The vertical angles $\theta_{11}$, $\theta_{12}$, $\theta_{13}$ and $\theta_{14}$ of the prisms satisfying the above specification may be obtained from the previously shown conditions (6) to (9), and each design value is as follows:

|   | (Example 1) | (Example 2) | (Example 3) |
|---|---|---|---|
| $\theta_{11}$ | 23.8° | 24.5° | 25.8° |
| $\theta_{12}$ | 13° | 9° | 2° |
| $\theta_{13}$ | 28.5° | 32.5° | 37.7° |
| $\theta_{14}$ | 18.2° | 17° | 18.9° |

In brief, according to the present invention, a high refractive index glass material of 1.6 or higher refractive index is used and a color resolving prism system having bias illumination means is formed by four prisms, the first and second prisms being cemented together and an air gap being interposed between the second and the third prism, thereby determining the range of the vertical angle of each prism for the intended F-number to be satisfied and for good bias illumination to be accomplished. The refractive index of each prism may be of any value greater than 1.6 but the refractive index obtained for usual glass material is of the order of 1.9 and this may be regarded as the upper limit.

What is claimed is:

1. A television camera comprising an objective lens, a plurality of image pickup devices, color resolution optical means disposed between said objective lens and said image pickup devices and formed of a first prism, a second prism, a third prism and a fourth prism as viewed from the objective lens side, said first and second prisms being cemented together with a first dichroic layer being interposed therebetween, said third and fourth prisms being cemented together with a second dichroic layer interposed therebetween, an air layer being disposed between said second and third prisms, said first to fourth prisms being formed of a high refractive index glass material of 1.6 or higher refractive index, the vertical angles $\theta 11$, $\theta 12$, $\theta 13$ and $\theta 14$ of said first, second, third and fourth prisms being of values within the following ranges:

$$23.3° \leq \theta_{11} \leq 25.8°$$

$$2° \leq \theta_{12} \leq 13°$$

$$28.5° \leq \theta_{13} \leq 37.7°$$

$$13.9° \leq \theta_{14} \leq 18.2°$$

and a bias light device for illuminating said plurality of image pickup devices with a low illumination through said first prism from the outside of that portion of the first prism through wihch the effective image forming beam from said objective lens passes.

* * * * *

UNITED STATES PATENT AND TRADEMARK OFFICE
CERTIFICATE OF CORRECTION

PATENT NO. : 4,262,305

DATED : April 14, 1981

INVENTOR(S) : TAKESHI SEKIGUCHI, ET AL.

It is certified that error appears in the above—identified patent and that said Letters Patent is hereby corrected as shown below:

Column 3, line 27 "the" should read --The--.

Column 3, line 40, "is" should read -- of --.

Column 5, line 60, "13"" should read --12"--.

Signed and Sealed this

Twenty-third Day of June 1981

[SEAL]

Attest:

RENE D. TEGTMEYER

Attesting Officer     Acting Commissioner of Patents and Trademarks